US012726897B2

(12) United States Patent
Hu et al.

(10) Patent No.: US 12,726,897 B2
(45) Date of Patent: Sep. 1, 2026

(54) BASE STATION DISCONTINUOUS RECEPTION AND TRANSMISSION DESIGN FOR ENERGY SAVING NETWORK

(71) Applicant: Samsung Electronics Co., Ltd., Gyeonggi-do (KR)

(72) Inventors: Liang Hu, San Diego, CA (US); Philippe Jean Marc Michel Sartori, Naperville, IL (US)

(73) Assignee: Samsung Electronics Co., Ltd (KR)

( * ) Notice: Subject to any disclaimer, the term of this patent is extended or adjusted under 35 U.S.C. 154(b) by 338 days.

(21) Appl. No.: 18/365,018

(22) Filed: Aug. 3, 2023

(65) Prior Publication Data

US 2024/0107444 A1 Mar. 28, 2024

Related U.S. Application Data

(60) Provisional application No. 63/410,037, filed on Sep. 26, 2022.

(51) Int. Cl.
*H04W 52/02* (2009.01)
*H04W 72/232* (2023.01)
*H04W 76/28* (2018.01)

(52) U.S. Cl.
CPC ..... *H04W 52/0206* (2013.01); *H04W 72/232* (2023.01); *H04W 76/28* (2018.02)

(58) Field of Classification Search
CPC ........... H04W 52/0206; H04W 72/232; H04W 76/28; H04W 52/0219; H04W 52/0229; H04W 52/0216; Y02D 30/70; H04L 5/0092; H04L 5/0053
See application file for complete search history.

(56) References Cited

U.S. PATENT DOCUMENTS 9,264,997 B2 2/2016 Gaal et al.
2016/0081137 A1 3/2016 Pang et al.
2016/0192432 A1* 6/2016 Maeda ................. H04W 24/02 455/418

(Continued)

FOREIGN PATENT DOCUMENTS

DE 10 2021 118 717 1/2022
EP 3 154 308 4/2017

(Continued)

OTHER PUBLICATIONS

Fan, "Electronic Device and Method in Wireless Communication System", Oct. 26, 2023, WO, WO 2023202657 (Year: 2023).*

(Continued)

*Primary Examiner* — Michael K Phillips
(74) *Attorney, Agent, or Firm* — The Farrell Law Firm, P.C.

(57) ABSTRACT

A method and at least one user equipment (UE) are disclosed. The method is performed by the at least one UE in a wireless communication system, and includes receiving, from a base station, group downlink control information (DCI) indicating a discontinuous reception (DRX) or discontinuous transmission (DTX) pattern. The at least one UE includes a memory device and a processor configured to execute instructions stored on the memory device. The instructions cause the processor to receive, from a base station, group DCI indicating a DRX or DTX pattern.

16 Claims, 10 Drawing Sheets

(56) References Cited

U.S. PATENT DOCUMENTS

| | | | | |
|---|---|---|---|---|
| 2017/0048918 | A1* | 2/2017 | Iwamura | H04W 76/27 |
| 2017/0150428 | A1* | 5/2017 | Nory | H04W 52/0216 |
| 2020/0245395 | A1 | 7/2020 | Zhang et al. | |
| 2021/0092681 | A1* | 3/2021 | Nory | H04W 76/28 |
| 2021/0314866 | A1* | 10/2021 | Lee | H04W 52/0229 |
| 2022/0201607 | A1 | 6/2022 | Zhao et al. | |
| 2022/0210866 | A1 | 6/2022 | He et al. | |
| 2022/0264464 | A1* | 8/2022 | Seo | H04L 5/0048 |
| 2023/0007587 | A1 | 1/2023 | Ly et al. | |
| 2023/0033440 | A1 | 2/2023 | Kadiri et al. | |
| 2023/0051778 | A1 | 2/2023 | Lee et al. | |
| 2023/0063082 | A1* | 3/2023 | Zhou | H04L 1/1864 |
| 2023/0254088 | A1* | 8/2023 | Ly | H04W 76/28 370/329 |
| 2023/0354188 | A1* | 11/2023 | Akl | H04W 76/28 |
| 2024/0073718 | A1* | 2/2024 | Dimou | H04W 24/10 |
| 2025/0056565 | A1* | 2/2025 | Guo | H04W 72/232 |
| 2025/0280466 | A1* | 9/2025 | Zhou | H04W 52/0206 |

FOREIGN PATENT DOCUMENTS

| | | | | |
|---|---|---|---|---|
| EP | 4 007 379 | | 6/2022 | |
| WO | WO 2022/130273 | | 6/2022 | |
| WO | WO-2022130273 | A1 * | 6/2022 | H04W 36/144 |
| WO | WO-2023202657 | A1 * | 10/2023 | H04W 72/23 |

OTHER PUBLICATIONS

ETSI TS 138 213 V16.5.0 (Apr. 2021), pp. 188.

Huawei, "New SI: Study on network energy savings for NR", 3GPP TSG RAN Meeting #94e RP-213554 Electronic Meeting, Dec. 6-17, 2021 (revision of RP-212709), pp. 5.

ETSI TS 138 321 V17.1.0 (Aug. 2022), pp. 244.

Ericsson, ST-Ericsson, "Extended cell DTX for enhanced energy-efficient network operation", 3GPP TSG-RAN WG1 #59 R1-095011 Jeju, Korea, Nov. 9-13, 2009, pp. 6.

Moderator (Intel Corporation), "Discussion Summary #2 for energy saving techniques of NW energy saving SI", 3GPP TSG RAN WG1 Meeting #110 R1-2208185 Toulouse, France, Aug. 22-26, 2022, pp. 122.

CATT, "UE Power Saving Schemes and Power Saving Signal/ Channel", R1-1902025, 3GPP TSG RAN WG1 Meeting #96, Feb. 25-Mar. 1, 2019, 25 pages.

CATT, "UE Power Saving Scheme for RRM Measurements", R1-1902026, 3GPP TSG RAN WG1 Meeting #96, Feb. 25-Mar. 1, 2019, 10 pages.

European Search Report dated Mar. 4, 2024 issued in counterpart application No. 23195025.4-1206, 9 pages.

EP Communication Report dated Mar. 6, 2025 issued in counterpart application No. 23195025.4-1206, 5 pages.

* cited by examiner

Radio
915

UE
905

Processing
circuit
920

BASE STATION DISCONTINUOUS RECEPTION AND TRANSMISSION DESIGN FOR ENERGY SAVING NETWORK

CROSS-REFERENCE TO RELATED APPLICATION

This application claims the priority benefit under 35 U.S.C. § 119(e) of U.S. Provisional Application No. 63/410,037, filed on Sep. 26, 2022, the disclosure of which is incorporated by reference in its entirety as if fully set forth herein.

TECHNICAL FIELD

The disclosure generally relates to network energy saving in cellular systems.

SUMMARY

Since the introduction of cellular systems, there has been a consistent trend towards denser networks, wider operating bandwidths, and the utilization of numerous antennas. Consequently, the power consumption of cellular networks has steadily increased and now represents a significant portion of an operator's operational expenditures (OPEX). Although power consumption reductions for user equipment (UE) have been standardized for some time, until recently, there had been minimal efforts to reduce power consumption at the network level. To address this issue, in Release 18, (Rel-18), 3rd Generation Partnership Project (3GPP) has commenced a study on reducing power consumption specifically at the network level.

One approach for reducing power consumption at the network level involves enabling the discontinuous transmission (DTX)/discontinuous reception (DRX) mode at the next-generation base station (gNB) and synchronizing the inactivity periods of UEs with the gNB using a UE DTX/DRX mode. This synchronization can be achieved in two ways: semi-statically and dynamically.

In the semi-static approach, the gNB is turned on and off in a predictable cycle, similar to the DTX/DRX cycles initially defined for UEs. This method is suitable when the traffic is relatively stable and predictable.

Semi-static DTX/DRX may be a pre-configured mechanism where the gNB goes to sleep for a predetermined period of time. The UEs may also be aware of this schedule and can go to sleep during the same time period. This type of DTX/DRX can be used in areas with low traffic, where the gNB can save energy without impacting the user experience.

On the other hand, a dynamic approach is more suitable for highly variable traffic. In this case, the gNB determines when to activate or deactivate based on the traffic demand and notifies the UEs accordingly.

Dynamic DTX/DRX may be a more flexible mechanism where the gNB can go to sleep based on the current traffic conditions. The UEs may also be aware of the gNB's sleep schedule and can adjust their own behavior accordingly. This type of DTX/DRX can be used in areas with high traffic, where the gNB can save energy without impacting the user experience.

Both methods require signaling of the gNB DTX/DRX pattern to the UEs. However, the signaling mechanism has drawbacks, as they may be slow because they rely on radio resource control (RRC) signaling, which hampers a speedy reconfiguration. Additionally, dedicated signaling for each UE may be required, leading to significant overhead when dealing with a large number of UEs.

Thus, the existing RRC mechanisms for reconfiguring UE DTX/DRX cycles are not suitable for achieving significant gains in network power reduction. Therefore, there is a need for a faster and more efficient procedure to signal the gNB DTX/DRX pattern to the UEs and modify the UE DTX/DRX configuration.

The present disclosure introduces several time-domain solutions that enable network power savings. Notably, the concept of UE connected discontinuous transmission/reception (C-DTX/DRX) is adapted to be used with gNB, and signaling is defined for UEs to operate in the presence of gNB DTX/DRX.

More particularly, a design for the gNB DTX/DRX mechanism is provided, aimed at achieving network energy savings. An advantage of implementing gNB DTX/DRX is the ability for the gNB to enter sleep mode, resulting in energy conservation. UEs also benefit from this scheme as they no longer need to continuously monitor a physical downlink control channel (PDCCH) and can enter sleep mode when the gNB is asleep.

The disclosure introduces two types of gNB DTX/DRX designs: semi-static DTX/DRX and dynamic DTX/DRX. Although these designs may differ in some characteristics, the signaling format between the gNB and UEs is similar in both designs, typically accomplished through layer 1 (L1) group common downlink control information (DCI).

Specifically, the disclosure presents a design for the gNB DTX and DRX mechanism in a UE-group or cell-specific manner.

For the semi-static DTX/DRX solution, a design is proposed, which includes a long duty cycle, a short duty cycle, and wake-up signal (WUS) occasions. These values and parameters are pre-configured by an RRC or system information block (SIB).

For the dynamic DTX/DRX solution, a design is provided where the gNB DTX/DRX pattern, including the on/off duration, is dynamically indicated through group common DCI.

The new design may also include three new options for group common DCI index 2 format 7 (2_7). These options may allow the gNB to dynamically indicate to the UEs which DTX/DRX pattern it is using. The new design also may include a new SIB type 1 (SIB 1) information element (IE) that allows the gNB to indicate to the UEs which DTX/DRX pattern it is using for RRC idle/inactive UEs.

In an embodiment, a method performed by at least one UE in a wireless communication system includes receiving, from a base station, group DCI indicating a DRX or DTX pattern.

In an embodiment, at least one UE comprises a memory device and a processor configured to execute instructions stored on the memory device. The instructions cause the processor to receive, from a base station, group DCI indicating a DRX or DTX pattern.

In an embodiment, a method performed by at least one UE in a wireless communication system includes transmitting, to a base station, a wake up signal (WUS) according to a semi-static operating procedure to initiate an active state based on a preconfigured timer.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
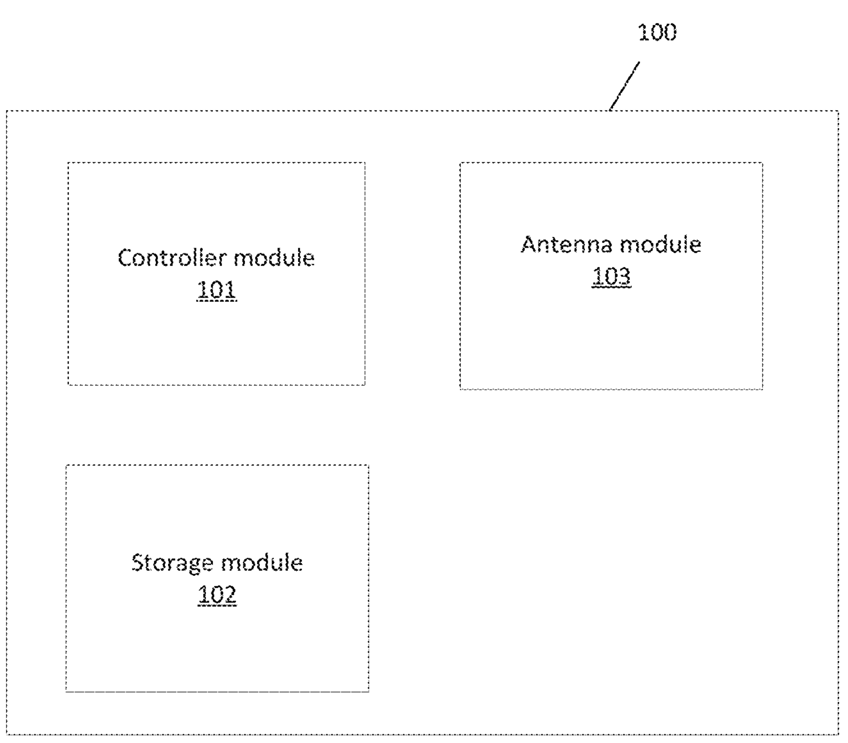
FIG. 1 illustrates a transmitting device or a receiving device in a communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

As described herein, the expression "DTX/DRX" is used to refer to "DTX or DRX". In addition, the order of "DTX" and "DRX" may be interchangeable. For example, "DTX/DRX" may mean "DRX/DTX", "DTX or DRX" or "DRX or DTX".

FIG. 1 illustrates a transmitting device or a receiving device in a communication system, according to an embodiment.

Referring to FIG. 1, the device 100 may be a UE (e.g., a client device) or a base station (e.g., a gNB) and includes a controller module 101 (e.g., a processor), a storage module 102, and an antenna module 103.

The controller module 101, storage module 102, and antenna module 103 may be structural components to facilitate efficient and accurate transmission or reception of wireless signals.

The controller module 101 may include at least one processor and may execute instructions that are stored in the storage module 102. For example, the controller module 101 may execute instructions for performing signaling techniques described herein. In addition, the controller module 101 may include a digital signal processor (DSP) for performing signal processing on a signal. The DSP may include one or more processing modules for functions such as synchronization, equalization, and demodulation. The processing modules may be implemented using one or more DSP techniques, such as fast Fourier transform (FFT), inverse FFT (IFFT), and digital filtering. Additionally or alternatively, the controller module 101 may include an application processor for running user applications on the device 100, such as web browsers, video players, and other software applications. The application processor may include one or more processing units, memory devices, and input/output interfaces.

The storage module 102 may include transitory or non-transitory memory storing instructions that, when executed, cause the controller module 101 to perform steps to execute signaling techniques described herein. In addition, the storage module 102 may include a protocol stack for implementing communication protocols. The protocol stack may include one or more layers, such as a physical layer, a medium access control (MAC) layer, a radio link control (RLC) layer, and a packet data convergence protocol (PDCP) layer.

The antenna module 103 may include one or more antennas for wirelessly transmitting and receiving signals to a base station, UE or another device. For example, the antenna module 103 may receive a signal transmitted by a base station and convert it into an electrical signal.

The device 100 may be a receiver of a wireless communication system (e.g., the UE in a 5G NR system) in downlink, i.e., the UE receives and demodulates data transmitted by the gNB. In addition, the device 100 may also transmit a signal via the antenna module 103 and, therefore, may be a transmitter or a gNB.

New radio (NR) UE DRX (e.g., as described in 3GPP technical specification (TS) 38.321) is a mechanism introduced in the early stage of long-term evolution (LTE) and carried over to NR to prolong the battery life of a UE by reducing power consumption. In the absence of DRX, the UE is constantly required to monitor the PDCCH for downlink (DL) assignments or uplink (UL) grants, which drains the battery quickly. However, with DRX configured in RRC CONNECTED mode, the network instructs the UE when it should monitor the PDCCH, leading to power savings.

A DRX configuration includes parameters such as the DRX short cycle and DRX long cycle, collectively referred to as the DRX cycle. Within each DRX cycle, there is an "ON duration" during which the UE's medium access control (MAC) entity monitors the PDCCH. The duration of the ON period is determined by a drx-onDurationTimer, and a drx-SlotOffset specifies the delay from the start of the DRX cycle before starting the drx-onDurationTimer. The initiation of a new DRX cycle depends on whether the UE has received a new DL assignment or UL grant within a specific time defined by the drx-InactivityTimer, which restarts whenever PDCCH indicates a new transmission.

In addition to the timers associated with DRX, there are timers related to hybrid automatic repeat request (HARQ) and its retransmissions. These timers, specific to each HARQ process, also influence the UE's PDCCH monitoring behavior and power-saving opportunities. For example, when a MAC protocol data unit (PDU) is received in a configured DL assignment, a drx-HARQ-RTTTimerDL is activated for the corresponding HARQ process. If neither the drx-InactivityTimer nor the drx-onDurationTimer is running, the UE can avoid monitoring the PDCCH. However, if the drx-HARQ-RTTTimerDL expires and the data of the corresponding HARQ process was not successfully decoded, the drx-RetransmissionTimerDL is initiated, and the UE must monitor the PDCCH.

Furthermore, the UE can receive a DRX command MAC control element (CE) or a long DRX command MAC CE. Upon receiving either of these MAC CEs, the UE switches to using a short DRX cycle or a long DRX cycle, depending on the received MAC CE and whether short DRX was configured for the UE. If the UE is not configured with a short DRX cycle but receives a DRX command MAC CE, it initiates the long DRX cycle. The availability of both short DRX and long DRX cycles allows a balance between power savings in the UE and the delay associated with delivering UL or DL data when it becomes available.

To further optimize power consumption, the network may configure the UE to limit channel state information (CSI) reporting only during the ON durations of the DRX. However, regardless of PDCCH monitoring, the MAC entity transmits HARQ feedback and an aperiodic sounding reference signal (SRS) when expected.

Accordingly, the UE C-DRX configuration may be a UE-specific RRC configuration. When there is a larger number of C-DRX configurations for UEs, the existing RRC signaling creates a lot of overhead and it may be slow since the gNB needs to configure each serving UE separately. In addition, the gNB may not be able to enter the sleep mode during the time when it sequentially configures a C-DRX pattern for each UE.

Figure 2A:
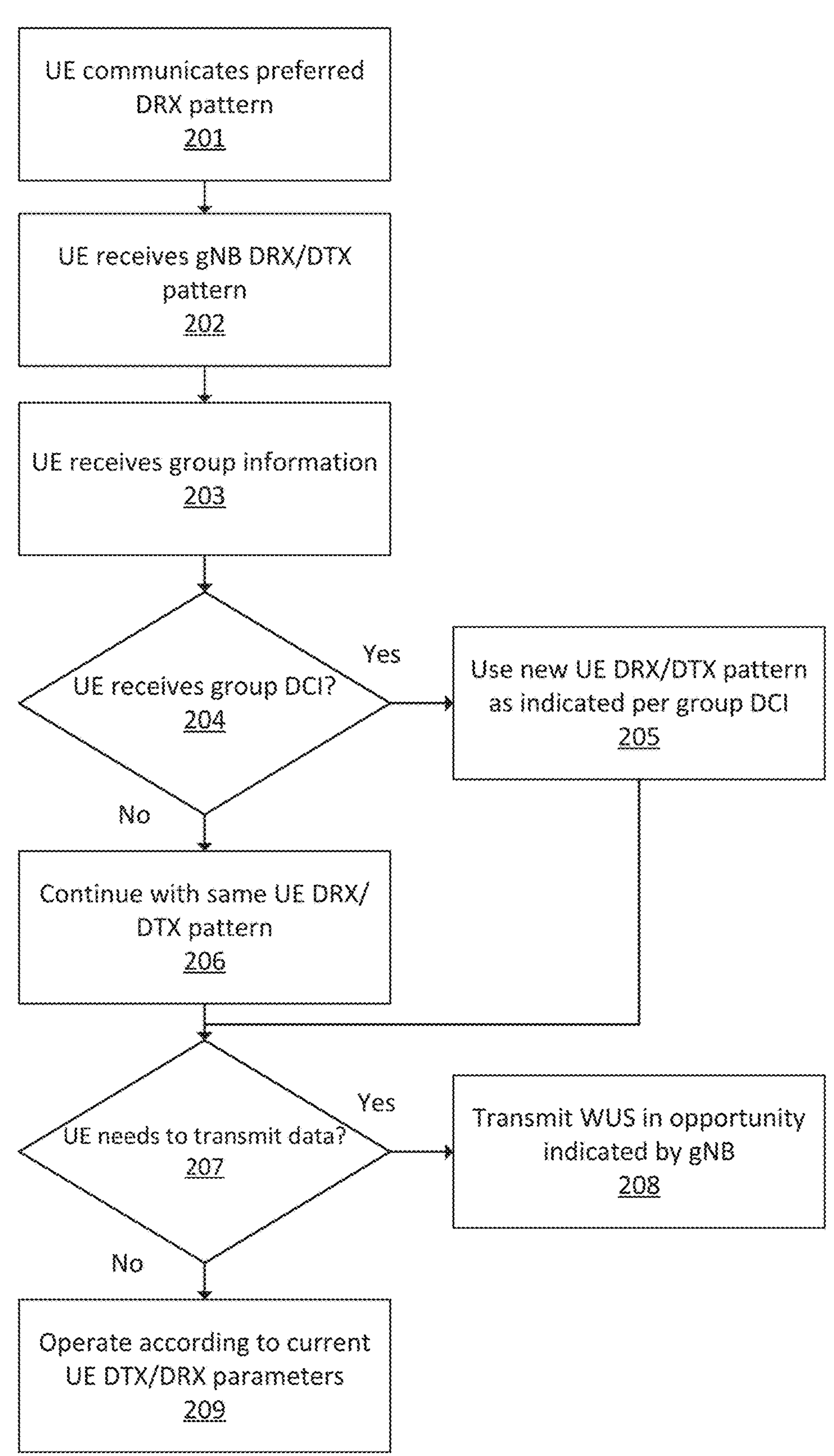
FIG. 2A illustrates a flowchart for semi-static and dynamic gNB DTX/DRX signaling, according to an embodiment.

FIG. 2A illustrates a flowchart for semi-static and dynamic gNB DTX/DRX signaling, according to an embodiment.

Referring to FIG. 2A, in step 201, one or more serving UEs communicate their preferred UE-specific DRX or DTX configurations to the gNB (gNodeB) through, for example, UE assistance information conveyed as an RRC message to the gNB. The assistance information may be provided by the UE to indicate the UE's ability to receive DRX or DTX patterns. For example, the assistance information may indicate predefined time slots for receiving the DRX or DTX patterns. Accordingly, the gNB may gather information about the existing DRX patterns of the UEs it serves. The UE receives the gNB DTX/DRX pattern in step 202. By considering the preferred DRX patterns of all the serving UEs, the gNB can make a decision regarding the cell-specific gNB DTX and DRX pattern. Accordingly, the gNB may optimize energy savings without compromising the performance of the UEs. In step 203, the UE receives group information.

In step 204, the UE determines whether it receives group DCI. That is, if the gNB determines that an energy-saving operation is necessary, it broadcasts the cell-specific DTX and DRX pattern to all UEs that are either RRC connected or in an RRC inactive or idle state. This broadcast ensures that all UEs adopt the gNB's DTX and DRX pattern as their common pattern, rather than using their individual UE-specific DRX patterns. In this case, (yes in step 204), the new UE DTX/DRX pattern is used as indicated per group DCI in step 205 and the process continues to step 207. The broadcast signaling can be achieved through RRC system information for RRC connected, inactive, and idle UEs. Additionally, physical layer group common DCI can be utilized for RRC connected UEs. If the UE does not receive group DCI (no in step 204), then the UE continues to use the same UE DTX/DRX pattern in step 206.

Furthermore, depending on whether the gNB is in an energy-saving operation or not, the gNB has the capability to dynamically switch the serving UEs between their UE-specific DRX pattern (when the network energy-saving mode is deactivated) and the cell-specific DRX pattern (when the network energy-saving mode is activated).

In step 207, the UE determines whether it needs to transmit data. When the UE needs to transmit data (yes in step 207), it sends a WUS on a designated resource where it knows that the gNB will be listening in step 208. On the other hand, if the UE doesn't need to transmit data (no in step 207), the UE operates according to current UE DTX/DRX parameters in step 209.

According to an embodiment, the UE may indicate a preferred DRX pattern.

The UE has the option to indicate its preferred DRX or DTX patterns, or operate without indicating any preference. For example, if a UE requires ultra-reliable low-latency communication (URLLC) traffic, it may need to remain active at all times to ensure low latency. In such cases, the UE can inform the gNB in advance that sleep mode should be disabled.

However, indicating preferred DRX patterns is not always necessary. Sometimes, the DRX patterns can be exchanged solely between gNBs without involving the UE. Alternatively, the determination of UE DTX/DRX patterns can be determined only by the gNB. If DRX patterns are exchanged, the UE can send them either in response to a request from the gNB (solicited) or without any specific request (unsolicited), using methods such as RRC signaling or a MAC CE. These patterns can be sent during or immediately after the random access channel (RACH) procedure, or whenever there is a change in the UE's communication requirements.

The UE may receive the gNB's DTX information (pattern). The gNB's DTX and DRX pattern can be either semi-static or dynamic. In a semi-static pattern, the durations of the "gNB Tx Active State" and "gNB Tx Inactive State" are fixed, and the periodicity of the gNB pattern remains constant. This pattern is indicated through RRC signaling. In the case of a dynamic gNB pattern, the "gNB Tx Inactive State" is triggered dynamically by the network, typically through DCI. An advantage of the dynamic gNB DTX pattern is that the network can quickly respond to DL traffic activity, resulting in more instances of gNB sleep states. Consequently, the dynamic gNB DTX pattern can lead to higher network energy savings in certain scenarios. However, even for the dynamic DTX pattern, some RRC signaling may be necessary to inform the UE about its usage and to communicate resources for sending potential WUS, among other things.

Both the semi-static and dynamic gNB DTX patterns may be initiated by the gNB, which has knowledge of the number of connected UEs in its own cell and neighboring cells, as well as the delay requirements of established radio bearers. Based on this information, the gNB can initiate a semi-static gNB DTX pattern or dynamically trigger a "gNB Tx Inactive State" for a specific duration.

To ensure that UEs compliant with Release 17 are not affected, the duration of the "gNB Tx Inactive State" should not exceed the period of the synchronization signal block (SSB) minus the time taken to transmit the SSB. This constraint allows Release 17 UEs to listen to the SSB without any interruptions, regardless of whether the DTX pattern is semi-static or dynamic. Similarly, UEs in idle mode are not affected in their radio resource management (RRM) measurements.

However, in a green field deployment where there are no Release 17 UEs present, the duration constraint mentioned above may not apply.

Figure 2B:
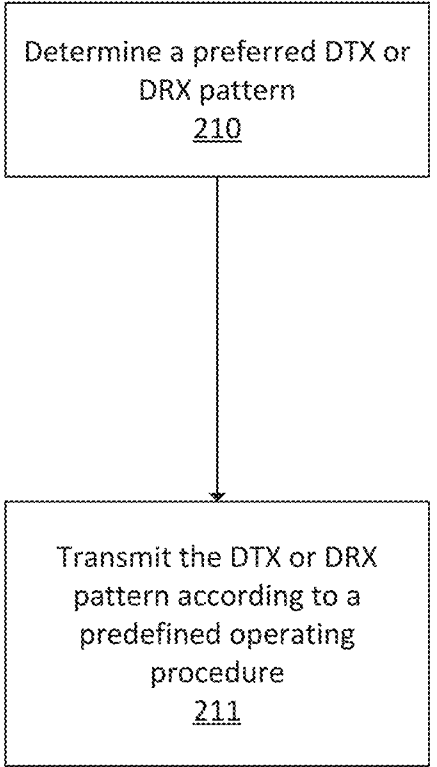
FIG. 2B illustrates a flowchart for transmitting a preferred DTX or DRX pattern, according to an embodiment.

FIG. 2B illustrates a flowchart for transmitting a preferred DTX or DRX pattern, according to an embodiment;

Referring to FIG. 2B, in step 210, a base station (e.g., a gNB) determines a preferred DTX or DRX pattern. As discussed above, the preferred DTX or DRX pattern may be used to coordinate data communication with at least one UE. The preferred DTX or DRX pattern may configure communication semi-statically or dynamically, and may be based on a preference of the UE.

In step 211, the base station transmits the preferred DTX or DRX pattern to the UE according to a predefined operation procedure. The predefined operating procedure may be based on a semi-static configuration or a dynamic configuration. In addition, the predefined operating procedure may assign a DTX or DRX pattern for a set of UEs. That is, a first set of UEs may be assigned a first DTX or DRX pattern, and a second set of UEs may be assigned a second DTX or DRX pattern.

Figure 3:
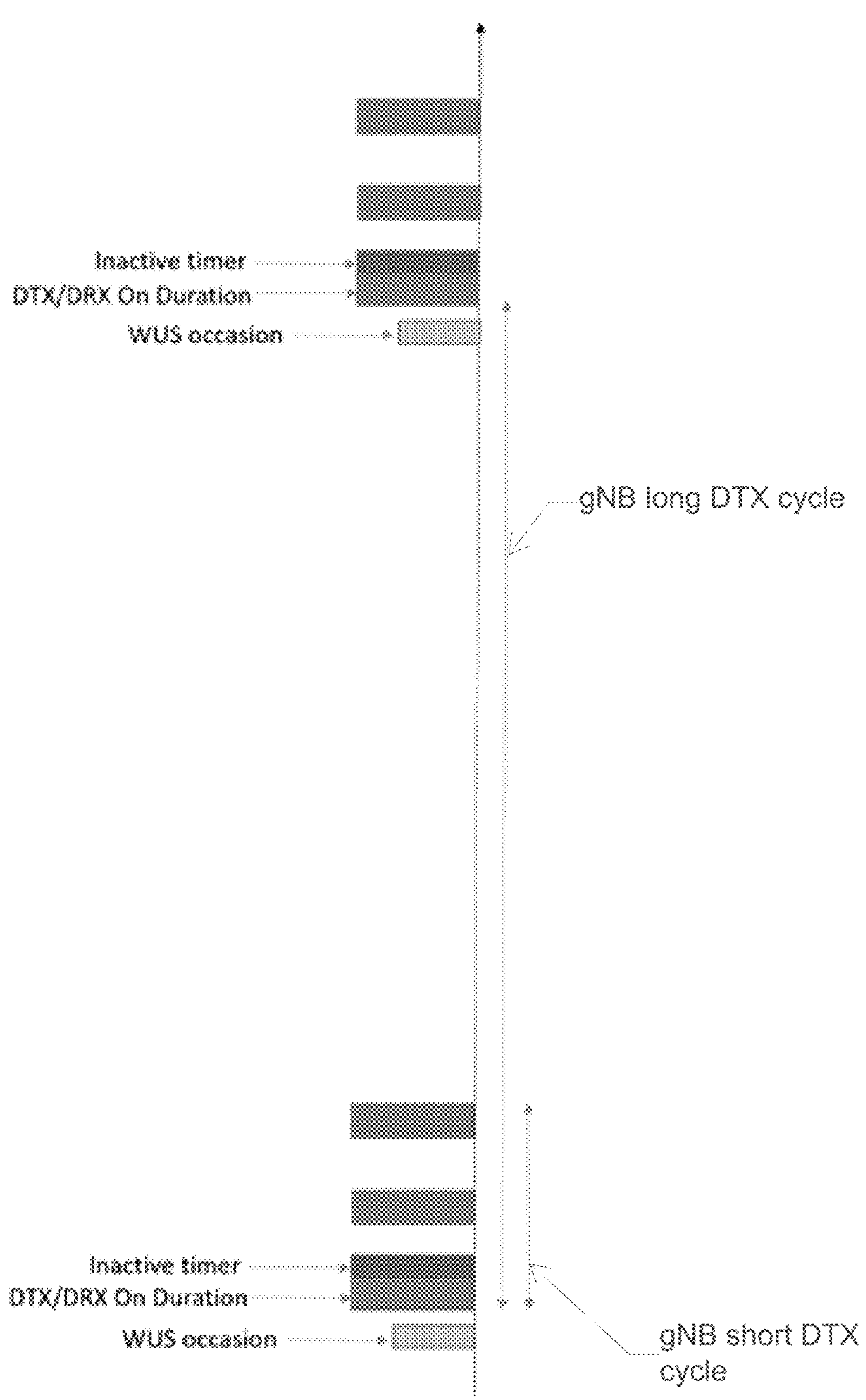
FIG. 3 illustrates a gNB DTX pattern for semi-static configuration, according to an embodiment.

FIG. 3 illustrates a gNB DTX pattern for semi-static configuration, according to an embodiment.

Referring to FIG. 3, configuring a relatively long DRX and DTX cycle may allow the gNB to transmit DL control signaling and a physical downlink shared channel (PDSCH) or receive UL scheduling requests (UL SRs), a channel quality indicator (CQI) group PUSCH, and a physical RACH (PRACH) transmission only during its active state, while being in a sleep state for the rest of the time. This approach significantly reduces energy consumption, as the longer the cycle, the lower the energy usage. In addition, the parameters for the DRX and DTX cycles can differ. For instance, the gNB DTX cycle can be longer than the gNB DRX cycle since reception consumes less power compared to transmission. Therefore, the gNB can listen more frequently at a relatively low cost, enabling a faster reaction if the gNB needs to transmission to the active state from the sleep state.

The use of DTX/DRX patterns at the gNB has implications for the scheduler, as the UE may only be able to be communicated to during its active state periods according to the DRX and DTX cycle. In some cases, if the gNB has scheduled a DL or UL transmission and is actively receiving or transmitting data, it is likely that it will schedule additional DL or UL transmissions in the near future. This could be due to the inability to transmit all the data in the buffer in one scheduling instance, requiring additional scheduling occasions. Waiting until the next activity period based on the DTX and DRX cycle, although possible, would introduce additional delays. To minimize these delays, the gNB remains in the active state for a configurable time after an active DL or UL transmission. This is accomplished by the gNB initiating or resetting an inactivity timer each time it schedules a DL or UL transmission, staying awake until the timer expires.

In most scenarios, a long DTX/DRX cycle combined with the gNB remaining awake for a period after scheduling is sufficient to minimize delays. However, certain services, particularly voice over Internet protocol (IP), involve regular transmission periods followed by periods of little or no activity. To address these services, an optional short DTX/DRX cycle can be employed in addition to the long cycle. Therefore, the gNB may follow the long DTX/DRX cycle, but if it recently scheduled a DL or UL transmission, it may switch to a short DTX/DRX cycle for a predefined duration.

Furthermore, the DTX and DRX mechanism can be further enhanced if the UE can inform the gNB to sleep for another long DTX and DRX cycle if no UL traffic is expected, rather than waking up regularly to transmit DL control signaling or monitor UL control signaling or data for a predefined time before returning to sleep. This may be considered as a concept that uses gNB WUS occasions, where the gNB wakes up for a configurable duration (significantly shorter than the on duration in the long DTX/DRX cycle) before the start of the long DTX/DRX cycle. In general, having knowledge of the UE's traffic pattern or UE-type information is beneficial for the gNB to tailor the DTX/DRX cycle accordingly.

Details pertaining to the signaling of the gNB DTX/DRX pattern in the semi-static solution are described below.

In the case of "semi-static" DTX/DRX configuration, the gNB DTX/DRX cycle can be described using one or all of the following parameter configurations (A)-(E):

(A). WUS "on" duration and periodicity. This refers to the duration and frequency at which the gNB remains awake to receive potential WUSs from the UEs. By enabling WUS, the gNB only needs to monitor the WUS instead of the entire long and short DTX/DRX cycles. If no WUS signal is detected for a predefined duration, the gNB can remain inactive until the next WUS occasion, skipping the DRX and DTX cycles. However, if a WUS signal is received, the gNB becomes active and may follow the short DRX and DTX cycle, as illustrated in FIG. 3.

(B). gNB "on" duration. This parameter specifies the duration for which the gNB remains active during the active state of the DTX/DRX cycle.

(C). Periodicity of a short DTX cycle. This refers to the frequency at which the gNB switches to the short DTX cycle during its active state.

(D). gNB inactive timer. The gNB inactive timer determines the duration for which the gNB remains inactive after the completion of an active state, allowing for periods of inactivity between cycles.

(E). gNB periodicity of a long DTX cycle. This parameter defines the frequency at which the gNB follows the long DTX cycle during its inactive state.

The set of possible gNB DTX and DRX patterns can be predefined and signaled to the serving UEs via RRC signaling with the following IEs in Table 1, below.

TABLE 1

| |
|---|
| Dtx/Drx-InactivityTimer: the gNB remains in the active state for a certain configurable time after being scheduled. This is implemented by the gNB (re)starting an inactivity timer every time it has a UL reception or DL transmission and remaining awake until the time expires. |
| values = X, Y, Z milliseconds (ms) |
| Dtx/Drx-LongCycleStartOffset |
| values = a, b, c |
| Dtx/Drx-onDurationTimer |
| values = l, m, n |
| Dtx/Drx-ShortCycleTimer: the gNB (re)starts an shortCycle timer every time it has a UL reception or DL transmission and remains in the short DTX/DRX Cycle until the time expires. If it expires, the gNB goes to the long DTX/DRX cycle. |
| values = o, p, q |
| Dtx/Drx-ShortCycle |
| values = e, f, g |
| Dtx/Drx-SlotOffset |
| values = a, b, c |
| WUS-Slotoffset |
| values = a, b, c |
| WUS-Cycle: it defines the gNB WUS occasion's periodicity and duration |
| values = e, f, g |

The gNB DRX pattern can be defined in a similar (or a different) manner as the gNB DTX pattern. In some cases, the gNB DRX pattern may be the same as (or different than) the gNB DTX pattern.

Figure 4:
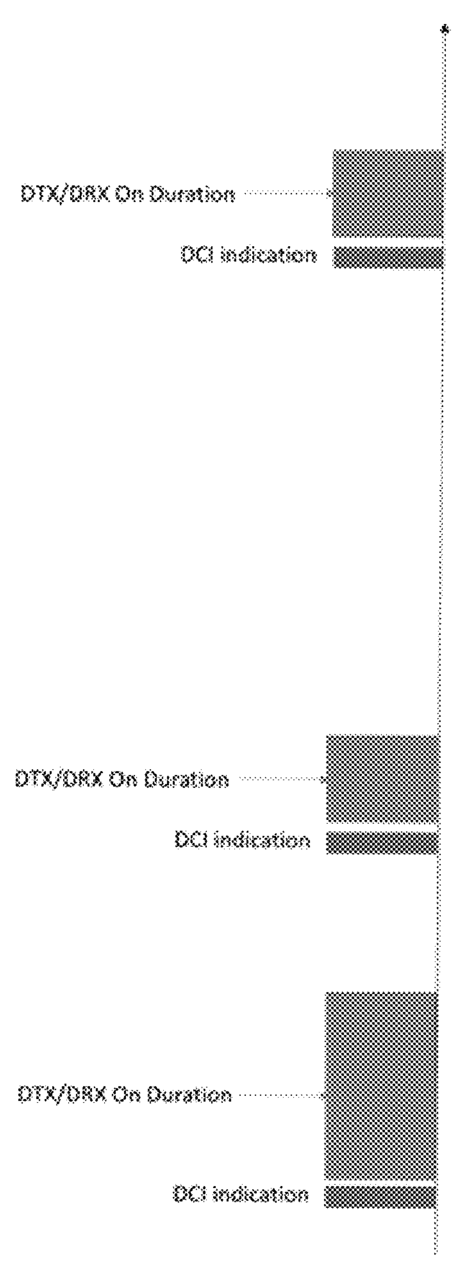
FIG. 4 illustrates a gNB DTX pattern for dynamic configuration, according to an embodiment.

FIG. 4 illustrates a gNB DTX pattern for dynamic configuration, according to an embodiment.

Referring to FIG. 4, DCI indicates the on/off status (duration) of the gNB for an upcoming number (N) of time slots to the serving UEs. If the newly indicated on/off duration conflicts with a previously indicated on/off duration, the previous indication becomes outdated and is no longer applicable. The specific format of the DCI for the dynamic solution is described below.

For the gNB DTX/DRX in "dynamic" DTX/DRX, the set of possible gNB DTX and DRX patterns can be predefined and signaled to the serving UEs via RRC signaling with the following IEs in Table 2, below.

TABLE 2

| |
|---|
| Dtx/Drx-InactivityTimer (optional): the gNB remains in the active state for a certain configurable time after being scheduled. This is implemented by the gNB (re)starting an inactivity timer every time it has a UL reception or DL transmission and remaining awake until the time expires. |
| values = X, Y, Z (ms) |
| Dtx/Drx-StartOffset |
| values = a, b, c |
| Dtx/Drx-EndOffset |
| values = a, b, c |
| Dtx/Drx-onDuration |
| values = l, m, n |

According to an embodiment, the gNB provides the serving UEs with a set of possible patterns for the DTX/DRX framework (e.g., one or more of the UEs may receive information from the gNB DTX/DRX common to a plurality of UEs). These patterns can include both semi-static and dynamic solutions. To enable the UEs to process the group DCI, a configuration is necessary. The gNB may signal a group configuration to the UE, which may include one or more of the following information: a group radio network temporary identifier (RNTI), allowing the UE to identify the DCIs it should process (referred to as NW_ES_RNTI); the order within the group, in cases where group commands can vary on a per-UE basis; and a list of indexes, where each index represents a specific DTX/DRX pattern configuration, as previously described, and one of the pattern indexes can also indicate "no DTX/DRX".

Accordingly, the gNB may use the RRC broadcast to transmit one or more DRX patterns to both serving UEs and idle/inactive UEs. This can involve introducing a new SIB signaling where a new IE may be added. Within each DRX pattern, there may be an associated index, and for each pattern, the aforementioned parameters may be defined in the IEs.

After gNB broadcasts group DCI, it is received by one or more UEs. The assigned PDCCH search spaces are monitored by the UE, which attempts to decode the group DCI. The following description explains how the format of the group common DCI is designed to indicate cell-specific gNB DTX and DRX patterns.

The group common DCI may serve as a dynamic signal that can activate the specific DRX pattern for each UE being served. For a simple gNB DTX and DRX pattern (contrasted with the parameters listed in Tables 1-2), the group common DCI may only indicate the gNB on/off pattern per time slot, where each symbol of the slot is designated as either gNB "on" or gNB "off." In such cases, the format of this DCI can resemble DCI format 2_0, which is typically used to notify serving UEs about the gNB's on/off status per symbol per time slot.

Accordingly, a new DCI format, referred to as DCI 2_7, is introduced for notifying serving UEs about the gNB's DTX and DRX for each symbol in every slot. In addition, DCI 2_7 may be scrambled by an RNTI.

A slot format indicator parameter (slotFormat_gNB_on-off_ToAddModList) may be configured by higher layer signaling according to Table 3, below.

TABLE 3

| Field (Item) | Bits | Reference |
|---|---|---|
| Identifier for DCI formats | 1 | |
| Slot format indicator | Variable | Bit size is determined by RRC message in DCI 2_0 |

For example, the slot format indicator parameter of the gNB may indicate on/off of one or more UEs according to a bit string indicating on/off slot format indicator 1, on/off slot format indicator 2, . . . , on/off indicator N.

The on/off slot format indicators displayed above may correspond to one or more individual UEs within a specific group, reflecting their status in relation to the gNB's DTX/DRX pattern. These indicators may follow a similar format to the NR slot format, representing the on/off state of each UE as defined by the RRC configuration. To convey one of these indicators to a group of UEs, DCI format 2_7 may be used.

In addition, for a gNB having multiple transmission reception points (M-TRPs), the following format, provided below in Table 4, may be used, where the on/off state per slot is per transmission configuration indicator (TCI) state (or per beam).

TABLE 4

| | UE 1 | UE 2 | . . . UE N |
|---|---|---|---|
| TCI state 1 | On/off indicator 1 | On/off indicator 2 | . . . On/off indicator N |
| TCI state 2 | On/off indicator 2 | On/off indicator 3 | . . . On/off indicator N |
| TCI state 3 | On/off indicator 3 | On/off indicator 4 | . . . On/off indicator N |

Additionally or alternatively, DCI format 2_7 can be used to provide DTX-indicator information.

Figure 5:
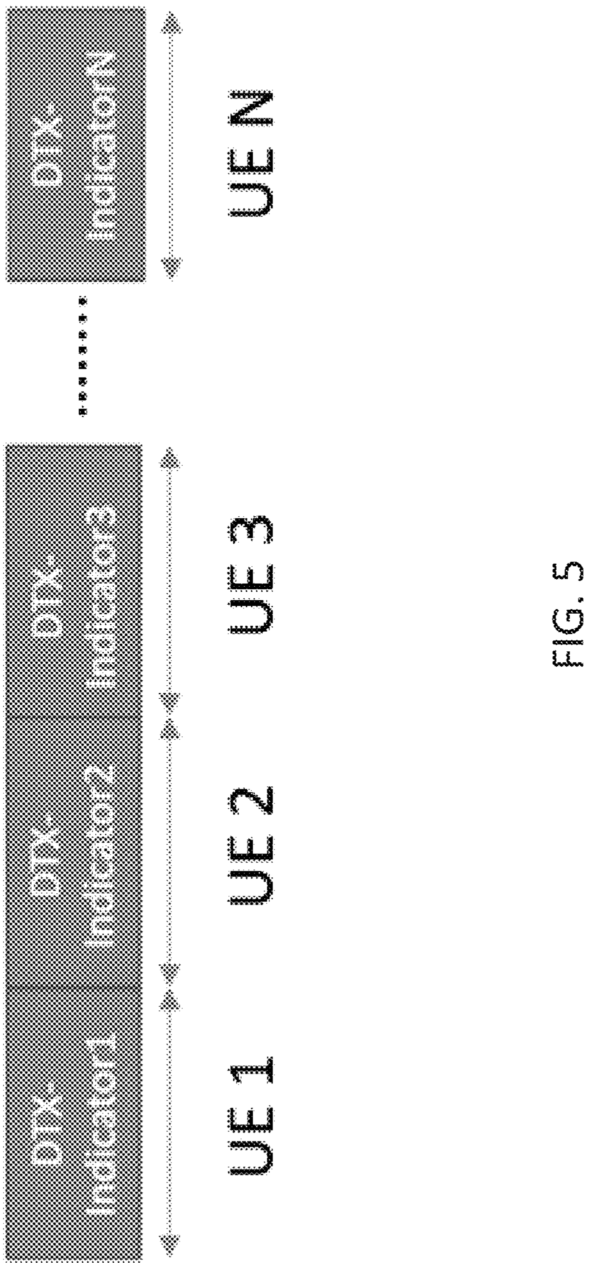
FIG. 5 illustrates a DCI format pattern for providing DTX indicator information, according to an embodiment.

FIG. 5 illustrates a DCI format pattern for providing DTX indicator information, according to an embodiment.

Referring to FIG. 5, a type of DCI format 2_7 (e.g., option one), which may be similar to DCI format 2_6, is applied. The DCI may be used to notify the gNB DTX/DRX pattern for one or more UEs. The DCI may be scrambled by NW_ES-RNTI.

The structure of the DCI format 2_7 may include "block 1", "block 2", . . . "block N".

For a semi-static DTX/DRX embodiment, the structure of each block may include one or more of the DCI fields, shown below in Table 5.

TABLE 5

| Field (Item) | Bits |
|---|---|
| Dtx/Drx-LongCycleStartOffset | 2 |
| Dtx/Drx-onDurationTimer | 1 |
| Dtx/Drx-LongCycle | 2 |
| Dtx/Drx-InactivityTimer | 1 |
| Dtx/Drx-ShortCycle | 1 |
| Dtx/Drx-ShortCycleTimer | 1 |
| WUS-Cycle | 1 |

For a dynamic DTX/DRX embodiment, the structure of each block may include one or more of the DCI fields, shown below in Table 6.

TABLE 6

| Field (Item) | Bits |
|---|---|
| Dtx/Drx-StartOffset | 2 |
| Dtx/Drx-EndOffset | 1 |
| Dtx/Drx-onDuration | 2 |
| Dtx/Drx-InactivityTimer (optional) | 1 |

The group common DCI format 2_7 may include a single-bit flag that distinguishes between the semi-static and dynamic gNB DTX/DRX solution. This flag allows the UE to interpret the corresponding DCI fields based on either Table 5 (semi-static solution) or Table 6 (dynamic solution), above. Additionally or alternatively, it is also possible to define two distinct types of DCIs: one specifically for dynamic indication and another for semi-static indication. The UE can be configured to monitor a specific DCI format, depending on the desired mode. Also, the interpretation method of the group DCI can be configured by RRC signaling.

With respect to Table 6, above, for the dynamic solution, the field "Dtx/Drx-StartOffset" may indicate the offset time slot (and/or symbols) from which the DTX/DRX starts to the slot where the UE receives the group common DCI. The field "Dtx/Drx-StartOffset" may indicate the offset time slot (and/or symbols) from which the DTX/DRX ends to the slot where UE receives this group common DCI. The field "Dtx/Drx-onDuration" may indicate the number of consecutive time slots (and/or symbols) during which the gNB is active (or in-active). Alternatively, the field "Dtx/Drx-onDuration" can be a bitmap in which each bit indicates whether the gNB is active or inactive at each of the time slots (and/or symbols). The field "Dtx/Drx-InactivityTimer" may have the same definition as the semi-static solution.

Figure 6:
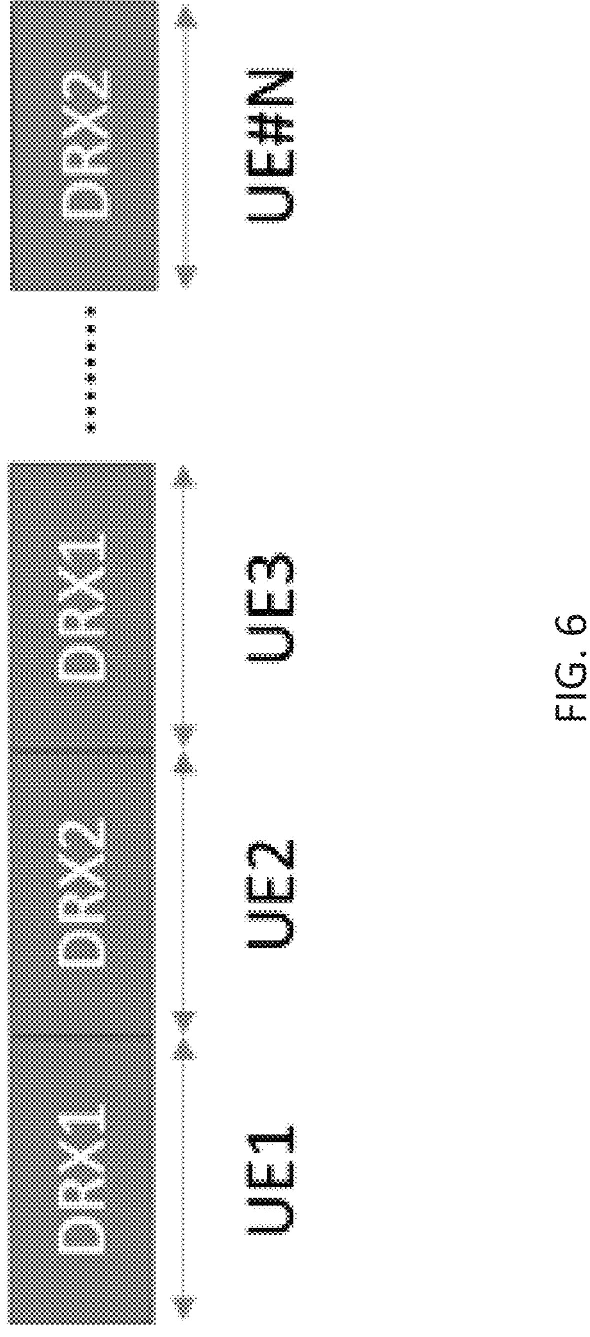
FIG. 6 illustrates a DCI format pattern for providing DRX indicator information, according to an embodiment.

FIG. 6 illustrates a DCI format pattern for providing DRX indicator information, according to an embodiment.

Referring to FIG. 6, a type of DCI format 2_7 (e.g., option two), is illustrated. Different UEs may receive different DRX patterns (e.g., DRX1, DRX2, etc.) with different configurations from the gNB in a predefined code points corresponding to specific values or codes that are predetermined and standardized for various purposes within the communication system. Thus, groups (or sets) of UEs can be configured with various DTX/DRX patterns.

More specifically, rather than transmitting the entire DTX/DRX pattern, it is possible to represent each block as an index to a predefined set of DTX/DRX patterns. In this approach, the gNB establishes a number of predetermined DTX/DRX patterns (e.g., 8), with each pattern being assigned to a specific index. Instead of including the entire block in the DCI format 2_7, only the corresponding index (e.g., 3 bits) needs to be transmitted.

Figure 7:
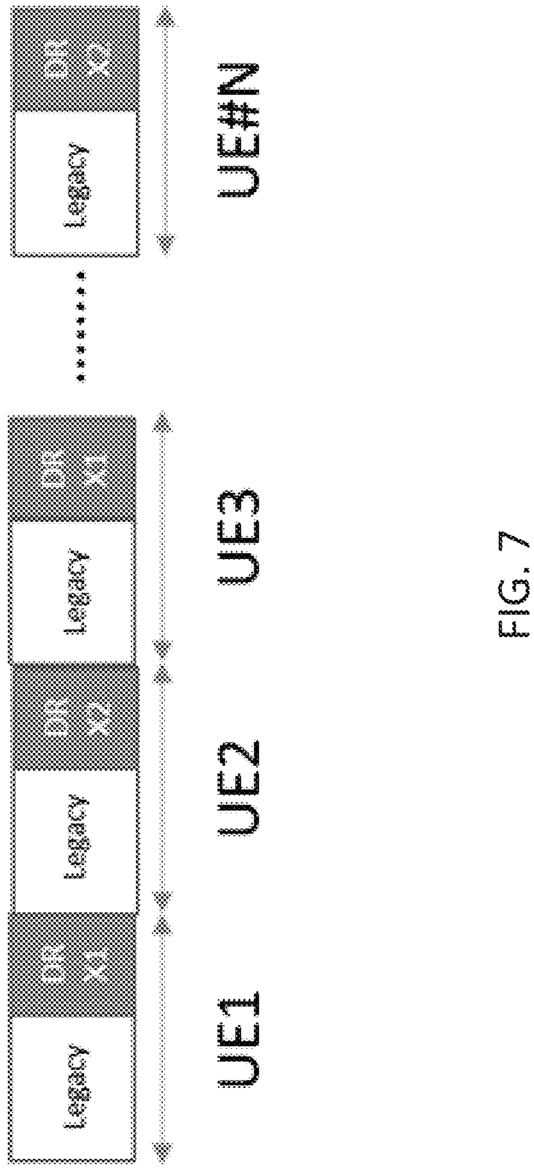
FIG. 7 illustrates a DCI format pattern for providing DRX indicator information, according to an embodiment.

FIG. 7 illustrates a DCI format pattern for providing DRX indicator information, according to an embodiment.

Referring to FIG. 7, a type of DCI format 2_7 (e.g., option three), is illustrated. In this case, a group common DCI format can also be an enhanced version of DCI format 2_6 by adding additional fields per block to indicate the gNB DTX/DRX pattern, as shown in FIG. 7. These additional fields may be the same as or similar to the fields shown in Tables 5-6.

For some or all of the embodiments mentioned above, UEs within a cell can receive information about the semi-static DTX pattern through system information (SI) broadcasts or dedicated RRC signaling. In the case of an RRC idle/inactive UE, a separate SIB 1 IE may be used to indicate the gNB on/off DTX and DRX pattern, which can differ from that of connected UEs. The SIB message may be broadcast by the gNB and include IEs specifying the gNB DRX and DTX configurations as outlined in Table 5-6, above.

Regarding dynamic solutions, when the gNB enters a "gNB Tx Inactive State," a group common DCI can trigger the initiation of this state and dynamically indicate its duration using DCI format 2_7. Similar principles can apply to the gNB pausing reception for dynamic gNB DRX.

Furthermore, the DRX configuration for each UE can be dynamically adjusted based on the base station's traffic load. For instance, when the base station's resource utilization is around 30% or lower and it aims to conserve power, it may choose to configure serving UEs or a group of UEs with a cell-specific gNB DTX/DRX pattern using DCI format 2_7. By aligning the C-DRX configurations among UEs, the base station can potentially extend sleep time, thereby saving energy. Thus, a mechanism for dynamic switching between UE-specific C-DRX configuration and UE group-specific C-DRX configuration based on traffic conditions is beneficial. This type of dynamic switching can be achieved through various options of DCI format 2_7, described above using option one, two, or three. Alternatively, instead of configuring the full DCI format 2_7 each time, a one-bit flag can be included in the DCI format 2_7 to instruct a specific UE or group of UEs to revert to their original UE-specific DRX pattern from the cell-specific DTX/DRX pattern.

Once the group DCI is received (or not received), the UE may adjust its DTX/DRX parameters accordingly based on the information provided.

According to an embodiment, the UE may establish a need for transmission. In such a case, the UE may be required to notify the gNB for the gNB to exit sleep mode. The procedure may include the UE determining the next location where it can transmit the WUS, and transmitting it to the gNB. The determination of the location of where to transmit the WUS may be based on the information transmitted by the gNB in the DTX/DRX pattern configuration.

According to an embodiment, network energy use can further be reduced based on DCI-based group common adaption for periodical signals. In legacy NR, numerous periodic and semi-persistent signals and channels are assigned to each UE, including CSI reference signals (CSI-RS s), group-common or UE-specific PDCCH, semi-persistent scheduling (SPS) PDSCH, physical UL control channel (PUCCH) carrying SR, PUCCH/PUSCH carrying CSI reports, PUCCH carrying HARQ-ACK for SPS, control grant (CG)-PUSCH, SRS, positioning RS (PRS), and more. To achieve network energy savings, it may be necessary to dynamically reconfigure these signals and channels at the cell level, rather than the semi-static UE-specific approach used in legacy NR. This enables better adaptation to changing network traffic conditions, reduces signaling overhead, and minimizes the gNB's active time by performing reconfiguration for each serving UE.

Two potential solutions can be applied to dynamically reconfigure these signals and channels at the cell level. First, the received DCI format 2_7 can be employed as a trigger for UEs to skip transmitting the already configured semi-persistent and periodic signals during periods when the gNB is inactive in the UL and DL. This approach eliminates unnecessary transmissions, optimizing energy usage. Second, a new group common DCI can be designed to activate or deactivate specific configurations of periodic and semi-persistent signals and channels, aligning with the gNB's DTX and DRX pattern. This facilitates efficient resource utilization and ensures effective energy management in the network.

According to an embodiment, paging may be optimized for network energy savings. Typically, paging occasions for UEs are evenly distributed over time to maximize system capacity. However, this approach results in high energy consumption for paging in the network. To address this, it would be advantageous to enhance the paging mechanism and provide better sleep opportunities for gNBs, particularly during low paging loads.

One potential solution involves implementing an adaptive paging occasion design based on estimated load. This can be achieved by configuring a set of paging occasions with different pattern designs through SIB 1. The gNB can then activate one of these paging occasions using a group common DCI message sent to all serving UEs, depending on the cell's traffic load.

Another approach is to co-locate the paging occasions in time with other DL signals, such as the master information block (MIB), SIBs, or secondary synchronization signal blocks (SSBs). By doing so, the gNB can transmit the paging messages without requiring additional energy specifically for the paging occasions. This piggybacking of paging on existing DL signals reduces overall energy consumption.

By implementing these enhanced paging mechanisms, the network can optimize energy usage during low paging loads and provide improved sleep opportunities for gNBs. This contributes to enhanced energy efficiency, reduces unnecessary energy consumption, and maintains an effective paging system while maximizing system capacity.

According to an embodiment, another energy saving scheme may include configuring cell common signals per total radiated power (TRP) for SIB 1 transmission and PRACH reception. Typically, SIB 1 is transmitted in all directions from all TRPs at the same periodicity. However, in scenarios with low traffic load, it is possible to reduce the frequency of SIB 1 transmission from specific TRPs or beam directions where there are fewer UEs, which can be communicated to UEs through either SSB or RRC signaling.

Specifically, the periodicity of SIB 1 transmission may be configured based on a TCI state. Similarly, the RACH configuration, which includes the parameters for RACH transmissions, can be tailored differently for various beam directions or TRPs depending on the traffic load in each direction. This entails adjusting parameters such as time resources, offset, and periodicity of RACH transmissions per TCI state.

By customizing the transmission patterns of SIB 1 and RACH based on the load levels per beam direction or TRP, the network can optimize energy usage while maintaining effective communication with UEs. This approach ensures that signaling and access procedures are adapted to the traffic conditions, improving overall energy efficiency in cellular networks.

Figure 8:
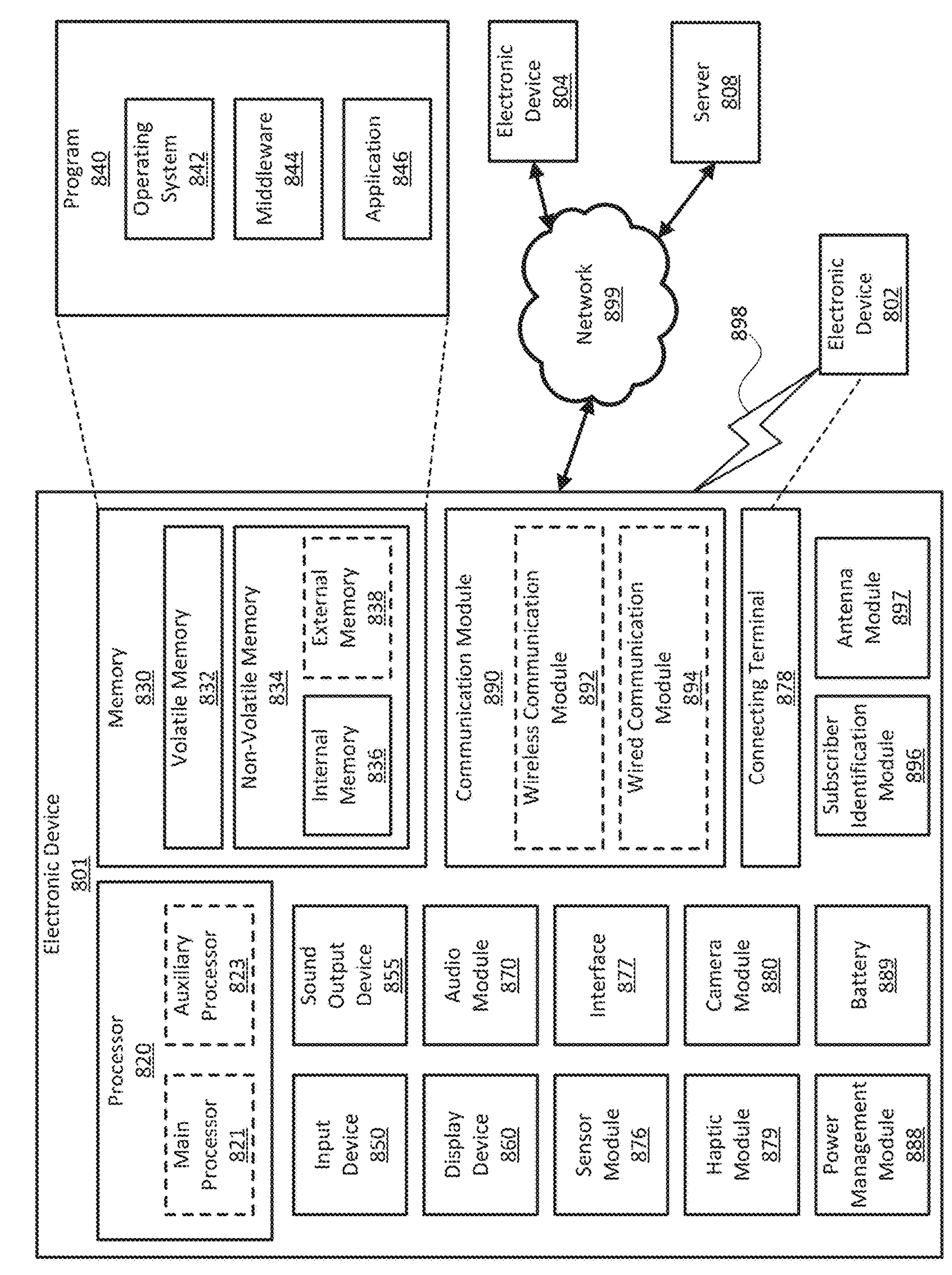
FIG. 8 is a block diagram of an electronic device in a network environment, according to an embodiment.

FIG. 8 is a block diagram of an electronic device in a network environment, according to an embodiment.

Referring to FIG. 8, an electronic device 801 (e.g., a base station or a UE) in a network environment 800 may communicate with an electronic device 802 (e.g., a base station or a UE) via a first network 898 (e.g., a short-range wireless communication network), or an electronic device 804 (e.g., a base station or a UE) or a server 808 (e.g., a base station or a UE) via a second network 899 (e.g., a long-range wireless communication network). The electronic device 801 may communicate with the electronic device 804 via the server 808. The electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) card 896, or an antenna module 897. In one embodiment, at least one (e.g., the display device 860 or the camera module 880) of the components may be omitted from the electronic device 801, or one or more other components may be added to the electronic device 801. Some of the components may be implemented as a single IC. For example, the sensor module 876 (e.g., a fingerprint sensor, an iris sensor, or an illuminance sensor) may be embedded in the display device 860 (e.g., a display).

The processor 820 may execute software (e.g., a program 840) to control at least one other component (e.g., a hardware or a software component) of the electronic device 801 coupled with the processor 820 and may perform various data processing or computations.

As at least part of the data processing or computations, the processor 820 may load a command or data received from another component (e.g., the sensor module 876 or the communication module 890) in volatile memory 832, process the command or the data stored in the volatile memory 832, and store resulting data in non-volatile memory 834. The processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or execute a particular function. The auxiliary processor 823 may be implemented as being separate from, or a part of, the main processor 821.

The auxiliary processor 823 may control at least some of the functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). The auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834. Non-volatile memory 834 may include internal memory 836 and/or external memory 838.

The program 840 may be stored in the memory 830 as software, and may include, for example, an operating system (OS) 842, middleware 844, or an application 846.

The input device 850 may receive a command or data to be used by another component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. The display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. The audio module 870 may obtain the sound via the input device 850 or output the sound via the sound output device 855 or a headphone of an external electronic device 802 directly (e.g., wired) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. The sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device 802 directly (e.g., wired) or wirelessly. The interface 877 may include, for example, a high-definition multimedia interface (HDMI), a universal serial bus (USB) interface, a secure digital (SD) card interface, or an audio interface.

A connecting terminal 878 may include a connector via which the electronic device 801 may be physically connected with the external electronic device 802. The connecting terminal 878 may include, for example, an HDMI connector, a USB connector, an SD card connector, or an audio connector (e.g., a headphone connector).

The haptic module 879 may convert an electrical signal into a mechanical stimulus (e.g., a vibration or a movement) or an electrical stimulus which may be recognized by a user via tactile sensation or kinesthetic sensation. The haptic module 879 may include, for example, a motor, a piezoelectric element, or an electrical stimulator.

The camera module 880 may capture a still image or moving images. The camera module 880 may include one or more lenses, image sensors, image signal processors, or flashes. The power management module 888 may manage power supplied to the electronic device 801. The power management module 888 may be implemented as at least part of, for example, a power management integrated circuit (PMIC).

The battery 889 may supply power to at least one component of the electronic device 801. The battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the AP) and supports a direct (e.g., wired) communication or a wireless communication. The communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as BLUETOOTH™, wireless-fidelity (Wi-Fi) direct, or a standard of the Infrared Data Association (IrDA)) or the second network 899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. The antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

Commands or data may be transmitted or received between the electronic device 801 and the external electronic device 804 via the server 808 coupled with the second network 899. Each of the electronic devices 802 and 804 may be a device of a same type as, or a different type, from the electronic device 801. All or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

Figure 9:
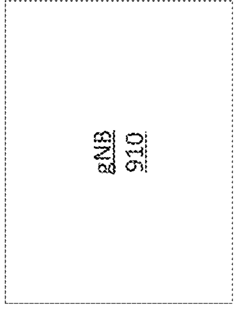
FIG. 9 shows a system including a UE and a gNB in communication with each other, according to an embodiment.

FIG. 9 shows a system including a UE 905 and a gNB 910, in communication with each other. The UE may include a radio 915 and a processing circuit (or a means for processing) 920, which may perform various methods disclosed herein. For example, the processing circuit 920 may receive, via the radio 915, transmissions from the network node (gNB) 910, and the processing circuit 920 may transmit, via the radio 915, signals to the gNB 910.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus.

Additionally or alternatively, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method performed by at least one user equipment (UE) in a wireless communication system, the method comprising:

receiving, from a base station, group downlink control information (DCI) indicating a transmit active state of the base station or a transmit inactive state of the base station according to a discontinuous reception (DRX) or discontinuous transmission (DTX) pattern, wherein a one bit flag indicating whether the DRX or DTX pattern is a semi-static configuration or a dynamic configuration is received with the group DCI.

2. The method of claim 1, wherein the DRX or DTX pattern is indicated according to a dynamic operating procedure in which the group DCI indicates an on/off status per time slot.

3. The method of claim 2, wherein the group DCI further indicates an on/off status for one or more symbols per time slot.

4. The method of claim 1, wherein the group DCI indicating the DRX or DTX pattern indicates an on/off status per cell.

5. The method of claim 1, wherein the group DCI indicates a first DRX or DTX pattern for a first set of UEs including the at least one UE, and the group DCI indicates a second DRX or DTX pattern for a second set of UEs.

6. The method of claim 1, wherein the group DCI includes a radio network temporary identifier (RNTI) identifying one or more DCIs to process.

7. The method of claim 1, wherein receiving the group DCI further comprises:

receiving, from the base station, the group DCI based on assistance information provided by the UE indicating a capability of the UE to receive the group DCI.

8. The method of claim 1, wherein the DRX or DTX pattern is received by the at least one UE periodically at predefined intervals.

9. At least one user equipment (UE), comprising:

a memory device, a processor configured to execute instructions stored on the memory device, wherein the instructions cause the processor to:

receive, from a base station, group downlink control information (DCI) indicating a transmit active state of the base station or a transmit inactive state of the base station according to a discontinuous reception (DRX) or discontinuous transmission (DTX) pattern, wherein a one bit flag indicating whether the DRX or DTX pattern is a semi-static configuration or a dynamic configuration is received with the group DCI.

10. The at least one UE of claim 9, wherein the DRX or DTX pattern is indicated according to a dynamic operating procedure in which the group DCI indicates an on/off status per time slot.

11. The at least one UE of claim 9, wherein the group DCI further indicates an on/off status for one or more symbols per time slot.

12. The at least one UE of claim 9, wherein the group DCI indicating the DRX or DTX pattern indicates an on/off status per cell.

13. The at least one UE of claim 9, wherein the group DCI indicates a first DRX or DTX pattern for a first set of UEs including the at least one UE, and the group DCI indicates a second DRX or DTX pattern for a second set of UEs.

14. The at least one UE of claim 9, wherein the group DCI includes a radio network temporary identifier (RNTI) identifying one or more DCIs to process.

15. The at least one UE of claim 9, wherein the group DCI is received, from the base station, based on assistance information provided by the UE indicating a capability of the UE to receive the group DCI.

16. The at least one UE of claim 9, wherein the DRX or DTX pattern is received by the at least one UE periodically at predefined intervals.

* * * * *